Patented May 6, 1930

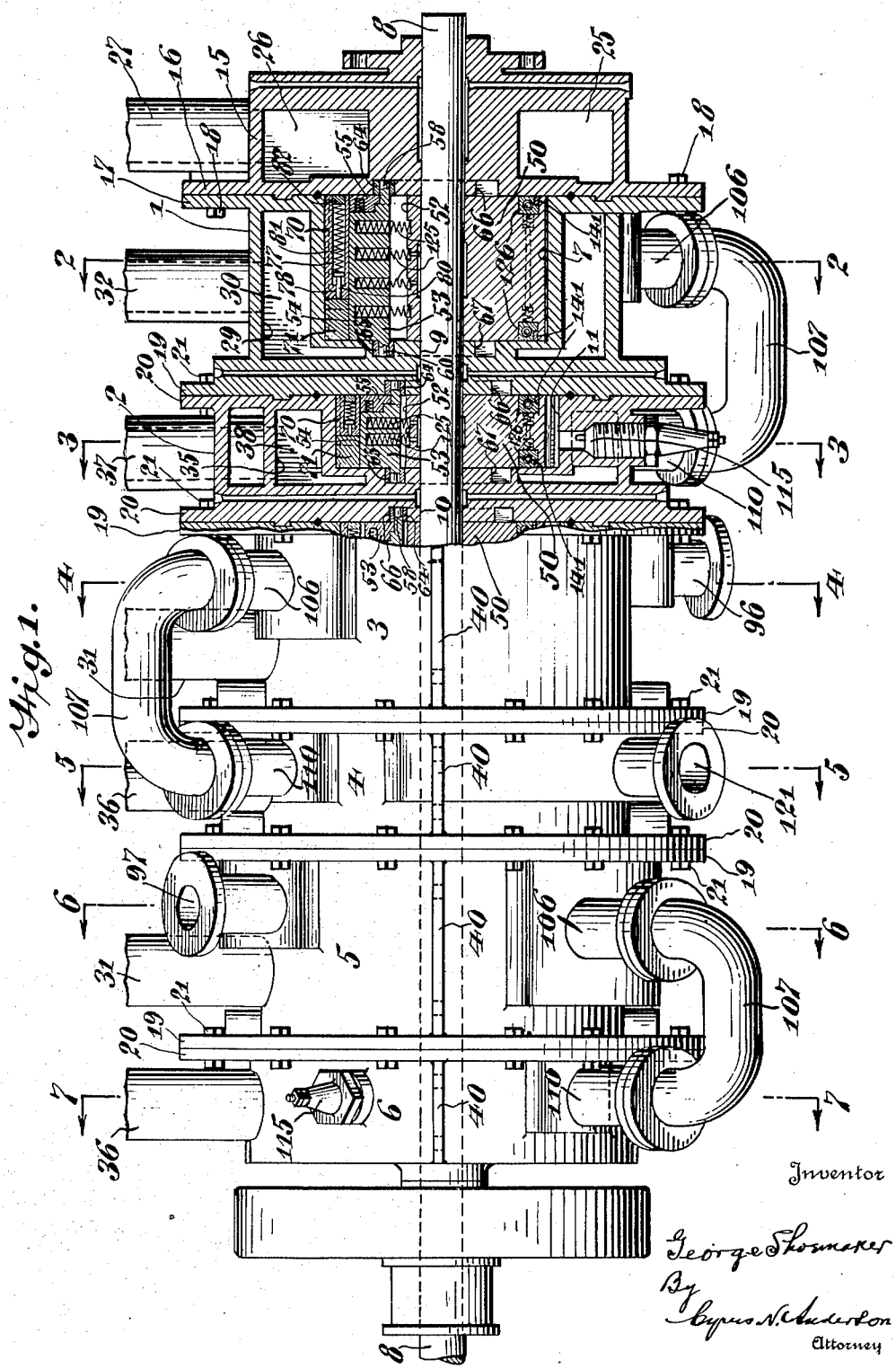

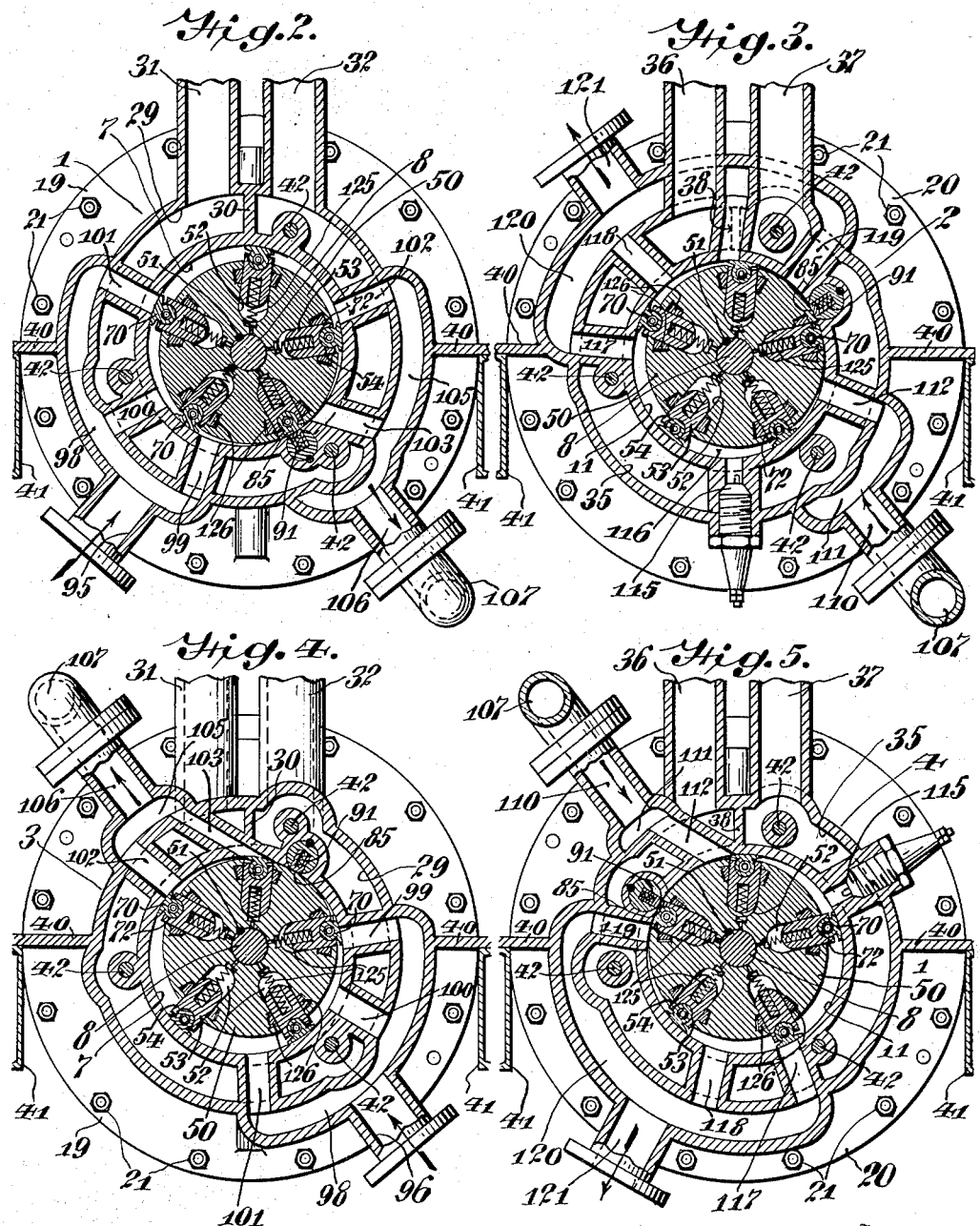

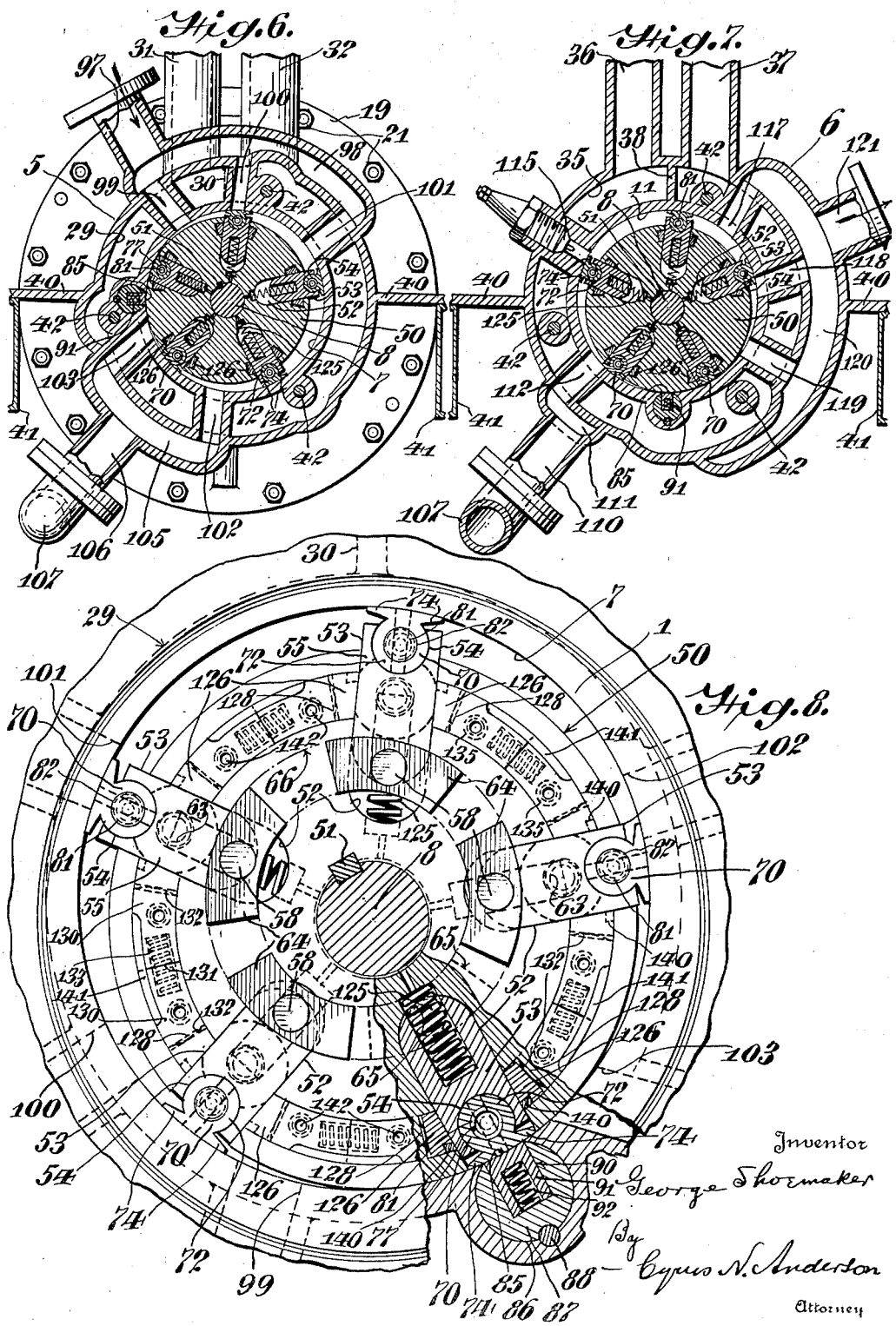

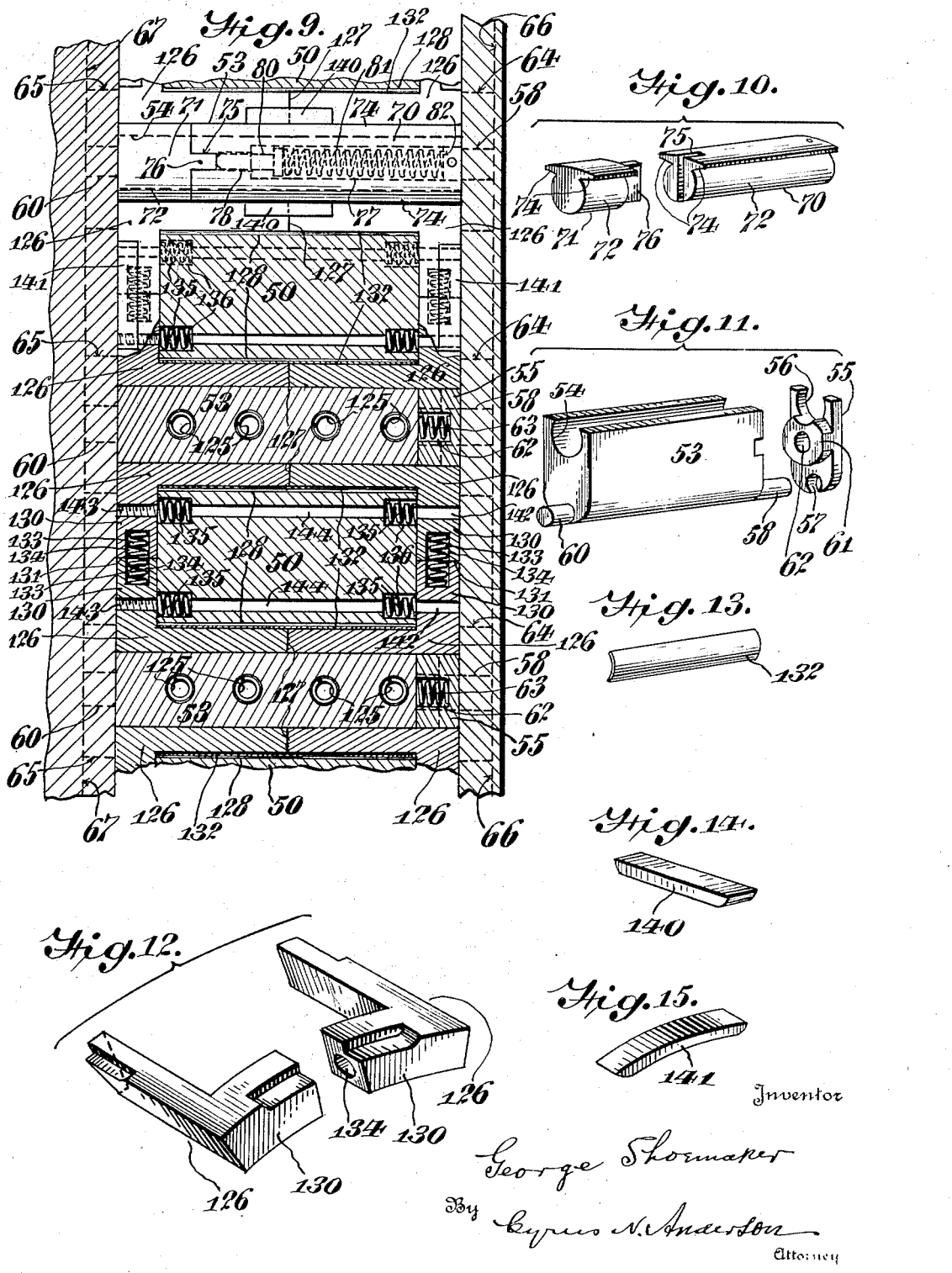

1,757,484

UNITED STATES PATENT OFFICE

GEORGE SHOEMAKER, OF PHILADELPHIA, PENNSYLVANIA

ROTARY ENGINE

Application filed January 17, 1928. Serial No. 247,300.

My invention relates to rotary engines of the type in which revolution of the rotors is effected by the explosion and internal combustion of gases within chambers provided in proper relation to the rotors.

The general object of the invention is to provide a rotary engine of novel construction in which the power resulting from the internal combustion of gases is so applied through rotors to a shaft as to cause the same to move steadily and continuously.

It also is an object of the invention to provide a rotary engine of novel construction in which increased efficiency as compared with previous constructions of rotary engines is obtained.

It is a further object of the invention to provide a construction which is relatively simple and which may be manufactured at reasonable cost.

There are other objects and advantages which are incident to the invention but no attempt will be made here to point them out. Such other objects and advantages either will be set forth specifically in the detailed description which follows or will become apparent from such description.

In order that the invention may be readily understood and its utility from a practical standpoint fully appreciated reference should be had to the accompanying drawings in which I have illustrated one embodiment thereof which at present is preferred by me. However, it will be understood that the invention is susceptible of embodiment in other forms of construction than that shown and that changes in the details of construction within the scope of the claims may be made without departing from the said invention or the principle thereof.

In the drawings:

Fig. 1 is a view partly in side elevation and partly in vertical central longitudinal section;

Fig. 2 is a transverse section taken on the line 2—2 of Fig. 1;

Fig. 3 is a transverse section taken on the line 3—3 of Fig. 1;

Fig. 4 is a transverse section taken on the line 4—4 of Fig. 1;

Fig. 5 is a transverse section taken on the line 5—5 of Fig. 1;

Fig. 6 is a transverse section taken on the line 6—6 of Fig. 1;

Fig. 7 is a transverse section taken on the line 7—7 of Fig. 1;

Fig. 8 is a view showing a cylinder and the rotor structure mounted therein partly in end elevation with parts thereof broken away and shown in section, and also showing the shaft upon which the rotors are mounted in transverse section;

Fig. 9 is a developed sectional plan view shown in a plane extending transversely of the rotor of a cylinder and of the casing therefor and in parallel relation to the axis of the shaft upon which the rotors of the engine are mounted;

Fig. 10 is a view in perspective of members or elements which when combined constitute a wearing member mounted upon the outer end of a piston;

Fig. 11 is a view of members which when united constitute the portion of a piston upon which the members shown in Fig. 10 are mounted;

Figs. 12, 13, 14 and 15 are views in perspective showing certain details of construction more clearly than they are shown in previous figures of the drawings.

In the drawings I have shown a plurality of cylinders arranged in adjoining relation to each other. The adjoining cylinders are fastened together by suitable means. The means employed for that purpose will be described in detail as this description proceeds. These cylinders are of different widths and are arranged in couples. The cylinders of greater width are employed as compression cylinders and those of less width are employed as power cylinders. Each pair or couple of cylinders, one being of greater width than the other, constitutes a unit. In the construction as illustrated I have provided three units which are adapted to cooperate with each other in the applying of power to a shaft to which rotors mounted within the cylinders are connected. The said rotors may be connected to the shaft in any suitable manner so that they must rotate together. In other words, there must not be relative rotation between the shaft and the rotors.

The rotors have means whereby five chambers are provided in each cylinder of the engine. It follows, therefore, that in the three compression cylinders referred to there are a total of fifteen chambers and a like number of chambers in the three power cylinders referred to.

Means is provided for delivering or supplying gas to each of the chambers successively of each of the compression cylinders; for transferring the gas after it is compressed in the said chambers to the chambers of the associated power cylinder of each unit; for exhausting the burnt gases from the chambers of the power cylinders; and for igniting or exploding the gases within the respective chambers of the power cylinders. These various means associated with the respective pairs of cylinders constituting units as above described, are angularly related to each other with respect to the axis of the shaft upon which the rotors are mounted; that is to say, assuming that the first pair of cylinders constituting a unit are located in one position, the other pairs of units are advanced, as it were, so that the different means or mechanism associated therewith as above described are located in a 120° advanced position with respect to the last preceding unit.

As above stated, the engine as illustrated comprises three pairs of cylinders and rotors each pair constituting a unit. The relation of the units to each other and of the cylinders of the respective units to each other is best shown in Fig. 1 of the drawings wherein I have shown at 1 a compression cylinder and at 2 a power cylinder of what may be regarded as the first unit. The second unit includes the compression cylinder 3 and the power cylinder 4, while the third unit comprises or includes the compression cylinder 5 and the power cylinder 6. The compression cylinder 1 is provided with an opening 7 eccentrically related to the axis of the shaft 8 which extends through all of the cylinders and which is supported in bearings provided in the cylinders, as indicated at 9 and 10. The power cylinder of each unit likewise is provided with an opening 11. One end or side of each of these openings is closed by an integral portion of the cylinder, as shown. The opposite end of the cylinder 1 is closed by a cap member 15, while the open ends of the remaining cylinders are closed by the ends of the adjoining cylinders which are in abutting or contacting relation with respect thereto.

The cap member 15 is provided with a flange 16 as shown which is adapted to be secured to a corresponding co-acting flange 17 upon the adjoining side of the cylinder 1. These flanges are secured together by means of bolts 18, as shown. Adjoining cylinders are connected to each other by means of annular flanges 19 and 20, as shown, which flanges are secured together by means of bolts 21.

It will be understood that the gas explosions which take place in the chambers within the cylinders as heretofore described will cause heating of the cylinders and in order to prevent over-heating thereof cooling means is provided. Cooling means also is provided for the cap member 15. It will be noted that the said member is provided with an opening 25. The said opening extends entirely around the said cap member except for a diaphragm or partition wall, indicated at 26. Water is supplied to the passage 25 through a pipe, not shown, and is discharged therefrom through a pipe 27. Each compression cylinder of each unit is provided with an annular passageway 29 the continuity of which is interrupted by a transverse plate or diaphragm 30. Water or other fluid cooling medium is introduced through a pipe 31 and after flowing through the passageway 29 around the cylinder is discharged therefrom through an outlet pipe 32. The pipes by means of which water is supplied to and removed from the passageway 25 of the cap member 15 are related to each other as are the pipes 31 and 32 by which water is supplied to and delivered from the annular passageways of the compression cylinders of the respective units.

The power cylinders likewise are provided with annular passageways 35 to which water is supplied by means of a pipe 36. The water, after having traveled through the said passageway around the power cylinder, is discharged through an outlet pipe 37, the adjoining ends of the pipes 36 and 37 being separated by a transverse plate 38. With respect to the cooling means each of the compression cylinders and the power cylinders of the respective units are identical in construction.

The cylinders of the engine structure are provided with diametrically opposed flanges 40 which are located in horizontal planes, which flanges rest upon the upper edges of supports 41 which are located upon opposite sides of the engine structure as indicated in Fig. 2 and subsequent figures of the drawings.

For the purpose of more firmly and rigidly connecting the cylinders of the engine structure to each other I have provided tie-rods 42 located at intervals around the axis of the structure and in parallel relation thereto.

The rotors in the several cylinders are of substantially the same construction so that a description of one will constitute a description of all.

The rotors of the compression cylinders 1, 3 and 5 of the respective units are illustrated in Figs. 2, 4 and 6, while the rotors of the power cylinders of the said respective units are illustrated in Figs. 3, 5 and 7. Upon a comparison of the rotors of the power cylinders of the respective units with the rotors of the compression cylinders it will be seen that they are of substantially if not identically the same construction except as to length. However, in the making of any such comparison it will be noted that the corresponding elements of the different compression cylinders are separated from each other or displaced with respect to each other through angles of 120°. It also will be noted that the same is true with respect to the rotors of the power cylinders.

Each of the several rotors comprises a main or body disk portion 50 having a central opening through which the shaft 8 extends. Each rotor is keyed to the shaft by means of a key 51. Each of the rotors is provided with radial slots extending parallel with the axis thereof constituting pockets 52 within which are mounted pistons. The radial slots forming the pockets open at their outer ends upon the peripheries of the rotors and terminate at their inner ends, as shown, a distance from the openings therethrough through which the shaft 8 extends. Each piston comprises a main or body member 53 which is provided with an under-cut slot 54 which is circular in cross section. The said piston also comprises a member 55 which is separable from the member 53 but constitutes a part of what may be described as the main or body portion of the piston structure. The member 55 is provided with an under-cut notch 56 constituting a continuation of the slot 54. At its lower or inner end the member 55 is provided with an opening 57 into and through which a projection 58 from the portion 53 of the piston extends. The opposite end of the portion 53 is provided with a similar projection 60. The member 55 is provided with a projection 61 upon its inner side which fits into a recess of corresponding shape provided in the adjoining end of the member 53. The projection 61 is provided with an opening 62 within which is located a spring 63 which operates to press the member 55 outwardly against the adjoining wall of the cylinder.

Guide or bearing blocks 64 and 65 are mounted upon the projections 58 and 60. The guide block 64 of the rotor mounted in the cylinder 1 is supported in a groove 66 which is provided in the inner side of the cap member 15. The said groove 66 is eccentric with respect to the axis of the shaft 8. The blocks 65 not only of the cylinder 1 but all other cylinders of the engine are located in grooves 67 provided in the bottoms of the openings of the cylinders within which the rotors are mounted. These grooves 67 likewise are eccentric with respect to the axis of the shaft 8. The groove for the blocks 64 in all of the cylinders except the cylinder 1 are provided in the bottoms of adjoining cylinders on the right, having reference to the relationship as shown in Fig 1 of the drawings.

The members 53 of the pistons are provided with sectional bearing blocks, as illustrated. Each bearing block comprises two members 70 and 71. Each of these members comprises a circular portion 72 which portions fit within under-cut circular slots or grooves 54 in the outer edge or end portions of the members 53 and 55. The outer sides of the blocks 70 and 71 are provided with laterally projecting flange portions 74. The outer surfaces of the blocks 70 and 71 are of curvilinear shape in cross section, the radius of the curvature thereof being the same as the radius of curvature of the inner surfaces of the cylinders with which the outer edge or bearing portions of the members 70 and 71 contact. This will be apparent upon reference to Figs. 2 to 8 of the drawings. The member 70 is provided with a vertical slot 75 at its inner end into which extends a projection 76 from the inner adjoining end of the member 71. When the member 76 projects into the slot 75 the top surface thereof is flush with the adjoining top surface of the member 70. The outer ends of the members 70 and 71 should at all times bear against the adjoining inner surfaces of the opposite ends of the cylinders within which they may be located. To insure that this shall be so I have provided in each of the members 70 a hole 77 which extends lengthwise thereof the inner end of which terminates a short distance from the bottom of the slot 75. A smaller hole 78 extends from the bottom of the hole 77 into the slot 75. A pin 80 projects through the hole 78 so that its inner end contacts with the inner end of the projection 76. A spring 81, located within the hole 77 with its inner end seated against the outer headed end of the pin 80 and its opposite or outer end against a plug 82 in the outer end of the opening 77, exerts pressure against the said pin 80 causing its inner end to press against the inner end of the projection 76 and thereby tend to cause separation of the members 70 and 71. It will be seen, therefore, that constant pressure is exerted to hold the outer ends of said members at all times in contact with opposing portions of the inner surfaces of the opposite ends of the cylinder.

The eccentric grooves 66 and 67 previously referred to and the lengths of the pistons comprising the parts 53, 55, 70 and 71 are so related to each other and to the diameters of the respective cylinders that as the rotors are rotated with the shaft 8 the outer bearing surfaces of the pistons provided upon the outer sides of the members 70 and 71 bear closely against the inner surfaces of the said cylinder. The diameters of the main or body portions 50 of the rotors are less than the internal diameters of the cylinders within which they are located, and the said rotors are so mounted that they contact with or touch the inner surfaces of the respective cylinders at one point, as indicated at 85. At the point of such contact in each cylinder the said cylinder is provided with a cylindrical hole or opening 86 which extends in parallel relation to the axis of the cylinder and upon its inner side opens into the cylinder. A slotted plug 87 is mounted within the said hole or opening, which slotted plug is held against turning by a key 88. The said slotted plug is provided with a slot 90 which extends lengthwise thereof. A bearing strip or block 91 is mounted within said slot and is pressed outwardly by means of springs 92 so that if there should be wear of the rotors or of the cylinders the blocks 91 would, due to the pressure of the springs 92, continue to contact with the peripheral surfaces of the rotors in the several cylinders and thereby prevent communication between the live fuel and exhaust gases in the spaces between the rotors and the cylinders upon opposite sides of the said block. The points of contact of the rotors with the cylinders above referred to are regarded as zero points because the gas is taken into the cylinders and discharged therefrom in adjoining relation to the opposite sides of the said points.

In Figs. 2, 4 and 6 of the drawings the points of the intake of the gas from the carburetor (not shown) are indicated. The gas for the respective cylinders 2, 4 and 6 is delivered thereby through intake ports 95, 96 and 97. The gas for these several ports is supplied from a manifold (not shown).

In describing the delivery of the gas to the compression cylinders reference will be made specifically to Fig. 2 but it will be understood that except for relative displacement the construction of the respective cylinders 2, 4 and 6 is the same. The gas is delivered through the intake port 95 into a chamber 98 of considerable length from which three inlet ports or passageways 99, 100 and 101 lead into the crescent shaped chamber between the rotors 50 and the inner surface of the cylinder. It will be observed that this crescent shaped space is divided into five chambers by the pistons comprising the members 53, etc., previously described. By the provision of a plurality of inlet ports or passageways 99, 100 and 101, as shown, it is insured that all of the chambers between the respective pistons will be completely filled with gas from the carburetor. A chamber between any two pistons having been supplied with gas the rotation of the rotor causes movement of the said chamber with the gas therein around the cylinder so that the space of the said chamber is decreased and the gas compressed and discharged therefrom through the exhaust ports 102 and 103 into a chamber 105 of considerable length. It will be noted that the inner end of the port or passageway 103 is located quite close to the zero point previously referred to, so that there is an opportunity for all gas within each and all of the chambers between each two adjoining pistons to be discharged from the compression cylinder into the chamber 105. It will be seen that the successive discharge of gas from a compression cylinder into the chamber 105 compresses the gas therein to great degree. The gas is conducted from the chamber 105 through a port 106 and pipe 107 to the intake port 110 of the adjoining power cylinder 2 of what will be called the first unit of the structure. It will be recalled that it already has been stated that the structure as illustrated includes three units and that each unit comprises a compression and a power cylinder.

The gas is discharged from the intake 110 into a chamber 111 from which it is conducted through an inlet port or passageway 112 into the space between the rotor in the said power cylinder and the inner surface of the cylinder. The gas is delivered into the said cylinder at a point in adjoining relation to the zero point of the cylinder and rotor to which reference has been made previously. The gas delivered into the chambers between the pistons of the power cylinder is under the requisite pressure, as has been indicated already.

The rotation of the shaft 8 and the rotors thereon in a clockwise direction carries the chambers of the power cylinders which are provided between the adjoining pistons thereof past an ignition device, such as a spark plug, indicated at 115 by means of which the gas within the adjoining chamber is ignited. Such ignition takes place successively in the chambers formed by the pistons of the rotor. The ignition of the gas causes, as is known, great pressure of the gases within such chamber. Upon reference to the chamber at 116 it will be noted that the area at the right hand end thereof, by reason of the tapered character of the said chamber, is less than the area of the opposite end thereof. In the construction as designed the area of the latter or left hand end of the chamber at 116 is three times the area of the opposite end thereof. By reason of that difference the pressure exerted against the rotor at the left hand side of the chamber at 116 would be three times the pressure exerted in the opposite direction. In consequence the resultant force exerted by the expansion of the exploded gases within the said chamber exerts pressure to cause rotation of the rotor and of the shaft to which it is connected in a clockwise direction. The burnt and expanded gases are discharged from the chambers between the pistons of the rotors of the power cylinders through exhaust ports or outlets 117, 118 and 119 into a chamber 120 and thence through the outlet port 121. The first of these ports is so positioned with respect to the cylinder that the gas is discharged from a cylinder before there is any excess of pressure therein tending to cause movement of the rotor in the opposite or anti-clockwise direction. It will be noted that the final exhaust opening 119 is located in adjoining relation to the zero point of the power cylinder.

In the foregoing description I have had reference to the power cylinder as illustrated in Fig. 3, but as stated with respect to the compression cylinders, all of the power cylinders are identical in construction except for the angular displacement through 120° with respect to each other of the corresponding parts upon successive cylinders. It will be observed upon references to Figs. 3, 5 and 7 that the zero points of the respective cylinders are spaced from each other through angles of 120°. These zero points may be described as the governing points because the points of delivery of the gas to the chambers of the cylinders and the exhaust of the burned gases therefrom are located with relation to the said zero points as will be apparent from an inspection of the drawings.

As has been stated already, the eccentric grooves 66 and 67 operate to hold the outer edges of the pistons at all times in contact with the surfaces of the interiors of the cylinders in which they may be located. It may happen that the grooves will become worn and therefore may not operate to hold the pistons with their outer edge portions tightly against the inner surfaces of the cylinder. For that reason springs 125 are provided which springs are under compression and exert a constant outward pressure tending to cause outward movement of the pistons and to hold the same with their outer edges at all times in contact with the interior surfaces of the cylinder.

For the purpose of insuring that the sides of the pistons, even though they may become worn, will at all times contact with portions of the opposite side walls of the pockets within which they may be mounted, and also for the purpose of insuring that the portions of the outer ends of the rotors 50 in adjoining relation to the peripheries thereof shall at all times contact with the opposite ends of the cylinders, I have provided the said rotors with what perhaps may be described as pressure retaining blocks 126. These blocks may be described as being of L-shape, as indicated in Figs. 9 and 12 of the drawings. It will be noted that there are four blocks associated with each portion of the rotor 50 which is located intermediate adjoining pockets. The inner portions of the blocks upon opposite sides of an intermediate portion of the rotor are located in abutting relation to each other, as indicated at 127. The said portions are mounted in slots 128 which extend lengthwise of the rotor. The said slots open into adjoining pockets so that the adjoining sides of the pressure retaining blocks 126 contact with the adjoining sides of the members 53 of the pistons located in the pockets. The members 126 terminate at their outer ends in right angular portions 130 which are located in grooves in the opposite ends of the intermediate portions of the rotors between adjoining pockets therein. The ends of these right angular projections are located in abutting relation to each other, as indicated at 131 in Fig. 9. For the purpose of causing the said members 126 to press against the pistons with which they are associated I have provided plate springs 132 which are located in the bottoms of the slots 128 which tend to force the portions of the pressure retaining blocks 126 which are in contact therewith toward the pistons. This pressure is supplemented by coiled springs 133 located in openings 134 provided in the opposing ends of the right angular portions 130, which openings are in registry with each other as shown in Fig. 9 of the drawings. For the purpose of holding the members 126 outwardly with the outer ends thereof in contact with the opposite ends of the cylinders in which they may be located I have provided coiled springs 135 which are located in couples, as shown in Fig. 9, in openings 136 at the opposite ends of the portions of the rotor intermediate adjoining pockets therein in which the pistons are located and operate.

For overlapping the joints between the inner end portions of the members 126 I have provided blocks 140 and for overlapping the joints between the adjoining opposing ends of the right angular portions 130 I have provided the blocks 141 which are of arc shape as shown.

As a convenience for assembling the parts 126 with the rotors I have provided holes 142 and 143 in the right angular portions of the respective members 126 the latter of said holes being screw threaded as shown. These holes when the said pressure retaining blocks 126 are placed in position as shown in Fig. 9 are in alinement with a hole 144 which extends through the intermediate portion of the rotor which is located between the said wearing members 126 which are mounted thereon. The hole 144 terminates at its outer ends in the holes 136 previously referred to. The said parts 126 having been assembled with the rotor they may be held in assembled relation by means of headed rods extended through the holes 142, 143 and 144 which rod is screwed into the screw threaded or tapped opening 143. After the rotor has been placed within a cylinder with all the pressure retaining blocks 126 and parts associated therewith in place the said rods then may be removed.

It will be seen from the foregoing and upon reference to the drawings that each of the compression and power cylinders is provided with five chambers, the said chambers being formed by the projection of the pistons across the crescent shaped space between the rotor 50 and the inner side of the cylinder opening. There being three power cylinders it follows that there are a total of fifteen of these chambers in the three power cylinders. It will be seen, therefore, that each chamber subtends an angle of 72°. The compressed combustible gas in the chambers of the respective cylinders is ignited or exploded successively during the rotation of the rotors. The spark control means (not shown) for controlling the sparking of the respective spark plugs is so timed that the ignition of the gas within the three chambers follows each other in rapid succession. In other words, the ignition of the gas in any two or more chambers is not effected at the same time or simultaneously.

Assuming for purposes of description that ignition of the charge of gas in the chamber at 116 is effected at a certain moment when the said chamber is in the position as illustrated in Fig. 3: the next ignition of the gas in a chamber will take place in the corresponding chamber of the cylinder shown in Fig. 5. The ignition in the latter chamber will take place following the ignition in the chamber at 116. The ignition in the power cylinder 7 will take place in a corresponding chamber following the ignition as described in the chamber of the cylinder 5. These ignitions in succeeding cylinders and in succeeding chambers follow each other in spaced relation to each other 24° apart; that is to say, after the ignition of the gas in a chamber in power cylinder 2 the said cylinder and all other cylinders rotate through an angle of 24° before the succeeding ignition is effected, and so on continuously.

It will be seen, therefore, that the rotors and the shaft 8 are subjected to power impulses rapidly and in succession. The periods of action of the expanding gases as ignition of the gas is effected successively in the chambers overlap each other so that power is applied at all times to the shaft tending to cause rotation thereof. The power is so applied that the said shaft is caused to rotate evenly or without vibration and without undesirable variation of power.

It will be seen that by my invention I have provided a rotor engine of relatively simple construction which is adapted to generate and produce a given amount of power efficiently and at relatively low cost.

Although in the description of the invention I have described and explained that the rotors are driven by the explosion of gases in the chambers of the respective power cylinders, I desire it to be understood that these rotors may be driven by the introduction of steam or any expanding gas under pressure into the chambers of the cylinders in successive and properly timed relation.

Having thus described my invention, what I claim and desire to secure by Letters Patent is:

1. In a rotary engine, the combination of a cylinder, a rotatable shaft extending therethrough in eccentric relation to the axis thereof, a rotor of cylindrical cross section mounted upon and secured to the said shaft so that the two rotate together, the said rotor being provided with radial pockets, pistons mounted within said pockets comprising body portions and wearing portions pivotally mounted upon the outer ends thereof, and the outer surfaces of said wearing portions being adapted to contact with the inner cylindrical surface of the said cylinder, means interposed between the said pistons and the opposite ends of the said cylinder to effect inward and outward movement of the said pistons to hold the outer ends thereof in contact with the inner cylindrical surface of the cylinder, wearing members mounted upon the portions of the said rotor intermediate the said pistons, means for yieldingly holding portions of the said wearing members against the opposite sides of the said pistons, and means for yieldingly holding the outer ends of said wearing members in contact with the inner sides of the opposite ends of the said cylinders.

2. In a rotary engine, the combination of a cylinder, a shaft extending through said cylinder and being located eccentrically thereof, a rotor mounted upon said shaft and being connected therewith, said rotor being of cylindrical cross section and of a diameter less than the internal diameter of the said cylinder and in contact with the inner cylindrical surface of the said cylinder along a line parallel with the axis thereof, the said rotor and cylinder coacting to form a space of crescent shape within the cylinder, and the said rotor being provided with radial pockets, pistons mounted within said pockets to move radially therein, which pistons respectively comprise a body portion and a wearing portion pivotally connected to the outer end thereof, the said two portions each consisting of two parts axially adjustable with relation to each other, the said parts being of different length and the longer part of the wearing portion extending across the joint between the two parts of the main portion of the said piston, yielding means interposed between the two parts of the respective portions which tends to hold them in separated relation with respect to each other, a plurality of wearing members movably mounted upon the portions of the rotor intermediate the said pockets and extending around the said portions, yielding means tending to cause movement of said members transversely of the said pockets, yielding means tending to cause movement of said members in directions parallel with the axis of the rotor so as to hold their outer ends in contact with the opposite ends of the cylinder, and blocks extending across and breaking the joints between adjoining portions of the said wearing members.

3. In a rotary engine, the combination of a cylinder having a shaft extending therethrough, a rotor mounted upon said shaft, the said rotor being provided with pockets, pistons mounted in said pockets, and a plurality of wearing members mounted upon each of the portions of the said rotor intermediate the said pockets, said wearing members being arranged in couples, means pressing each of the members of the respective couples outwardly in directions parallel with the axis of the rotor, and means pressing said couples away from each other in directions transversely of the length of said rotor to hold one edge of each couple in contact with an adjoining piston.

4. In a rotary engine, the combination of a cylinder having a shaft extending therethrough, a rotor mounted upon said shaft, the said rotor being provided with pockets, pistons mounted in said pockets, a plurality of couples of wearing members mounted upon each of the portions of the rotor intermediate the said pockets, means tending to cause movement of the said members transversely of the said pockets, and means tending to cause movements of each of the members of the respective couples outwardly.

In testimony that I claim the foregoing as my invention I have hereunto signed my name this 13th day of January, A. D. 1928.

GEORGE SHOEMAKER.